United States Patent [19]  [11] 4,030,848
Keifert et al.  [45] June 21, 1977

[54] LINED EQUIPMENT WITH DUAL BASE METAL INSERTS

[75] Inventors: Hibbard G. Keifert, Torrance, Calif.; Frank J. Waters, deceased, late of Northridge, Calif., by Ethel M. Waters, administratrix

[73] Assignee: Fansteel Inc., North Chicago, Ill.

[22] Filed: Oct. 18, 1976

[21] Appl. No.: 733,246

[52] U.S. Cl. .............................. 403/272; 228/165
[51] Int. Cl.² ........................................ F16B 5/08
[58] Field of Search .......... 52/758 B, 578; 228/165; 285/286; 403/270–272; 220/1 B, 3, 75, 76; 138/142, 143

[56]  References Cited
UNITED STATES PATENTS 3,443,306   5/1969   Meyer ............................... 228/165
3,457,961   7/1969   Long ..................................... 220/3

Primary Examiner—John E. Murtagh
Attorney, Agent, or Firm—Barnes, Kisselle, Raisch & Choate

[57] ABSTRACT

An improved composite wall construction and method of fabrication is disclosed in which a wall assembly is comprised of a base metal layer and a layer of corrosion resistant material containing an intermediate filler of base metal fusion welded to the original base metal members and to an inlaid insert of base metal at the weld root, and a fusion weld joining the layer of corrosion resistant material to provide a relatively smooth surface in the corrosion resistant layer.

10 Claims, 10 Drawing Figures

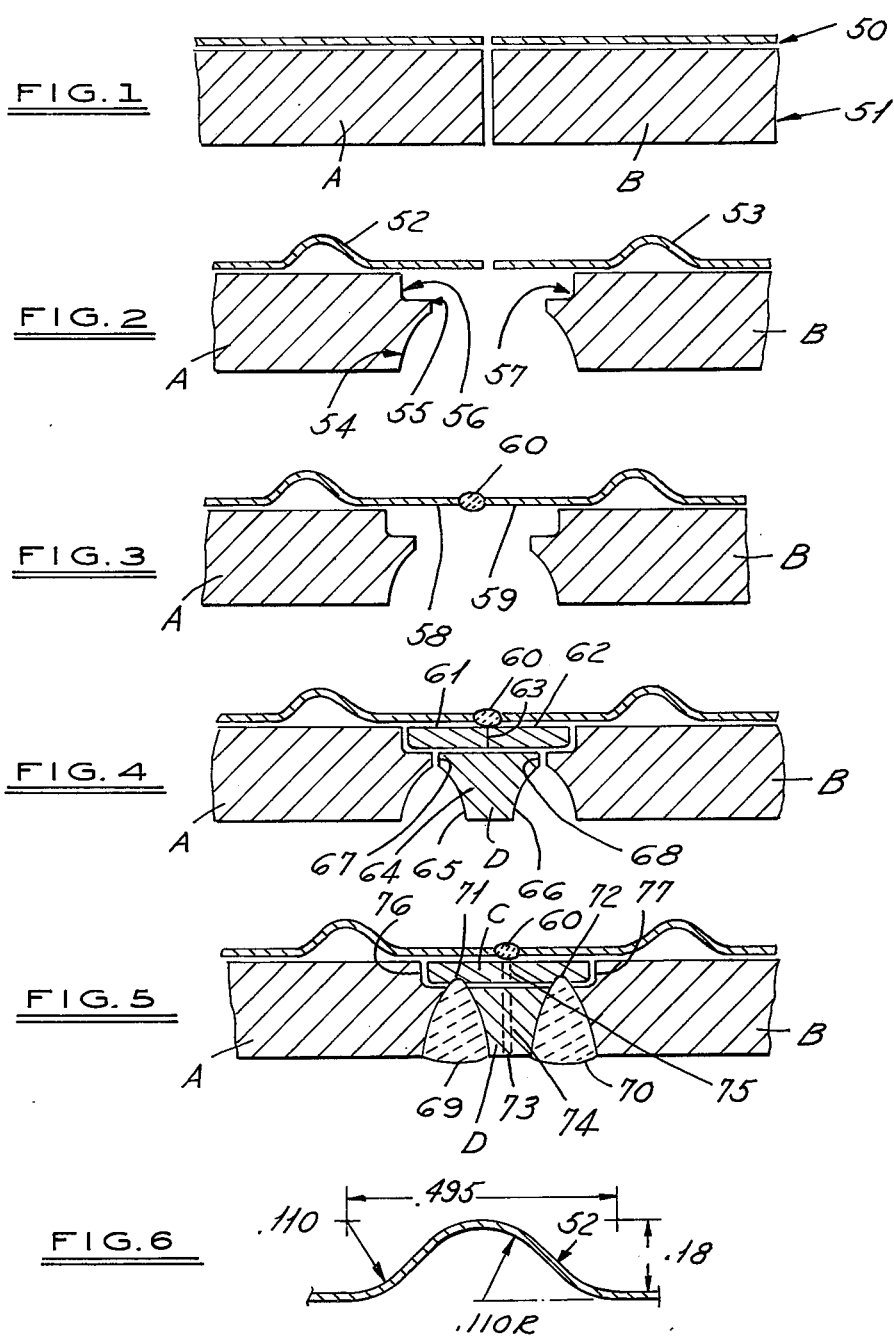

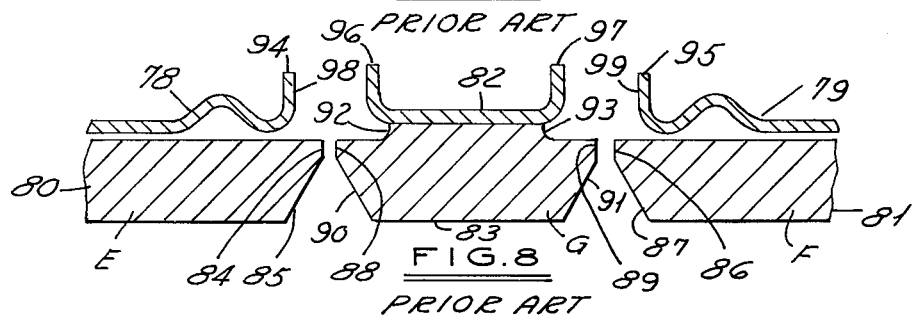
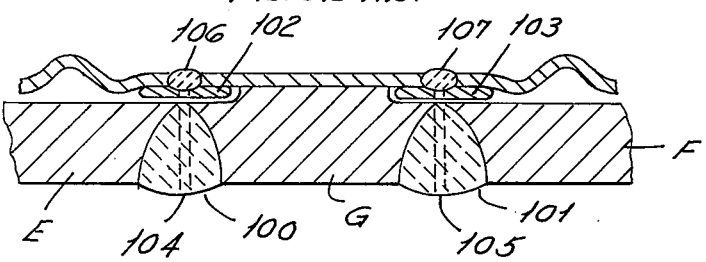
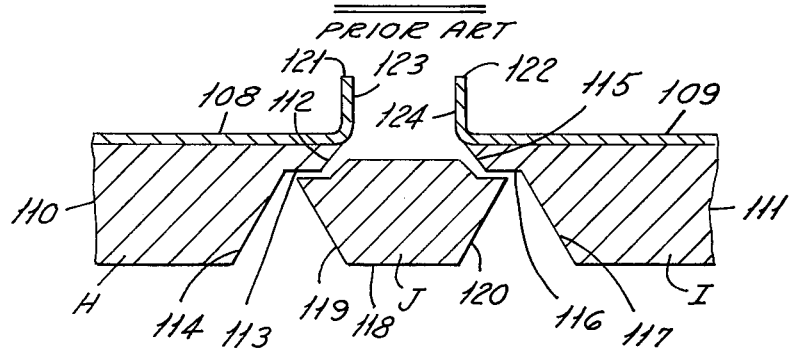
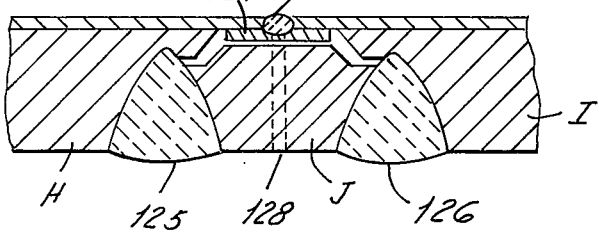

LINED EQUIPMENT WITH DUAL BASE METAL INSERTS

This invention covers an improved welded wall assembly and method of constructing it in the fabrication of industrial equipment that has walls comprised of two or more layers of materials, especially for chemical process equipment.

The method related to improvements in welded joints in equipment in which a surface layer of a special purpose metal or alloy, such as a metal having high corrosion resistance, is used in conjunction with a backing of a more common base metal. The invention especially relates to improved wall constructions with a surface liner or facing of a dissimilar material to that of the backing material, particularly to cases where the facing material is not generally metallurgically compatible with the backing material.

The improved method of fabrication of this invention can be applied to a large number of dissimilar metal combinations. These combinations include refractory and reactive metals, or their alloys, as liners or facings on backing materials such as mild steel, stainless steel, cooper-base alloys, nickelbase alloys, and cobalt-base alloys. The improved method can be applied with only slight modifications to wall assemblies where the special purpose metal is metallurgically bonded to the backing, or where the liner is unbonded to the backing.

Special purpose metal or alloy layers on a more common base metal substrate are well known in the art and have been used for many years. One general area where such dissimilar metal combinations have been employed is in chemical process equipment. Here it is typical practice to use a relatively thin layer of the special purpose metal or alloy to provide resistance to chemical attack, and use a lower cost, more common base metal as the structurally supporting backing. The fabrication of such equipment can present severe problems, especially when the lining material is metallurgically dissimilar from the backing material. For instance, consider a tantalum layer on a mild steel backing. Tantalum has a melting point about 3000° C. (5430° F.), while mild steel melts at about 1350° C. (2790° F.); mild steel has a coefficient of thermal expansion about twice that of tantalum; and iron and tantalum react at a sufficiently high temperature to produce the brittle intermetallic compound $TaFe_2$ and eutectics of this compound and the terminal iron-rich and tantalum-rich solid solutions (See "Columbium and Tantalum," by F. T. Sisco and E. Epremian, published by John Wiley and Sons, Inc., 1963).

A principal object of this invention is to provide an improved method for fabrication of a composite wall assembly comprised of a fusion welded thin layer of a special purpose metal or alloy such as a frefractory metal, or reactive metal, or their alloys, and a fusion welded iron-base or non-ferrous base metal on which the facing may either be metallurgically bonded or unbonded.

A further object is to provide a simplified method for wall fabrication of equipment having a special purpose metal or alloy liner and a more common base metal backing to improve the fitup of both members of the wall when the liner of special purpose metal is either metallurgically bonded or unbonded to the substrate.

An additional object is to provide an improved method of fabrication to produce sound, high quality, contamination-free, butt welds having a smooth, relatively distortion-free surface in both layers.

A further object is to provide an improved method of fabrication of a wall comprised of combinations of dissimilar metals or alloys so as to achieve a final welded assembly that will not have surface projections or irregularities such as batten straps, especially on the process side of chemical process equipment.

These and other objects provided by this improved method of fabrication will be apparent to those skilled in the art by the following description of drawings and a preferred embodiment of the invention.

In co-pending and co-assigned application, Ser. No. 733,244, filed Oct. 18, 1976, we have disclosed an improved wall assembly comprised of a base metal and a layer of special purpose metallic material containing an intermediate filler base metal member fusion welded to the original members of the base metal, with the fusion welds abutting at their roots to an inlaid insert of the special purpose material, and a fusion weld joining the layer of special purpose material so as to provide a relatively smooth surface in the special purpose material of the wall. In this co-pending application, the sequence of steps in the wall fabrication involves joining the base metal first, and completing the fusion weld in the special purpose metal last, with the weld roots in both the base metal and special purpose material abutting at their respective weld roots to an inlaid insert of special purpose material. The present invention involves a change in this procedure as well as in the material used.

DRAWINGS accompany the disclosure and the various views thereof may be briefly described as:

FIGS. 1 to 5 illustrate the various steps in the practice of the method of the present invention.

FIG. 6, a detail of a convolution in a facing sheet.

FIGS. 7 to 10, views of prior art construction.

In the current invention, the fusion weld joining the members of the special purpose facing layer are made first, and those fusion welds joining an insert of base metal to the base metal members are made last with their weld roots abutting an inlaid insert of base metal.

An example of the method of this invention is given as a specific embodiment in which a tantalum material is employed as a corrosion resistant facing material on a mild steel backing material. Tantalum-lined or clad materials have been used in a wide variety of chemical process applications where tantalum provides corrosion resistance to the severe corrosive environment. Because of the high cost of tantalum, such composite wall constructions are used in equipment to provide a tantalum lining to resist the corrosion conditions and a lower cost base metal, commonly mild or plain carbon steel, as the structural member or backing material in the wall. Some typical equipment used in the chemical process industry employing these combination of materials include: thermowells, bayonet heaters, various condensers and heat exchangers, vessels, piping, valves and fittings.

In the specific embodiment described in the example, the lining is usually either commercially pure, unalloyed tantalum, or it may be a tantalum alloy such as Fansteel "63" Metal manufactured by Fansteel Inc. The Fansteel 63 Metal contains 2.5 weight percent tungsten, 0.15 weight percent columbium, balance essentially tantalum as discussed in commonly assigned U.S. Pat. No. 3,592,639. This tantalum alloy material has an ultimate tensile strength about fifty percent higher and yield strength about twice that of unalloyed tantalum at a temperature about 200° C. (390° F.) which temperature is experienced in some chemical process applications. The corrosion resistance of this alloy has been shown to be at least equal to pure tantalum in many environments.

Although the lining material is described as unalloyed tantalum or Fansteel 63 Metal in the preferred embodiment, it should be readily apparent that the wall construction and methods of fabricating it, as described in this invention, can be equally well applied when the facing material is essentially any ductile, fabricable and weldable, refractory metal or alloy, including other tantalum-base alloys, columbium and columbium-base alloys, and vanadium and vanadium-base alloys, or the reactive metals titanium, zirconium, and hafnium, and their alloys.

The specific embodiment of the wall construction that is described employs mild steel as the backing material. Again, backing materials that can be utilized in wall constructions of this invention can be one or more layers of a number of common base metals, such as other fabricable and weldable steels, including stainless steels, copper-base, nickel-base, and cobalt-base materials; or the backing material can be a refractory metal or reactive metal, or their alloys, having a composition different from that of the facing material.

DESCRIPTION

FIG. 1 shows member A having an unbonded facing or liner 50 of Fansteel 63 metal and a mild steel substrate 51 to be joined to member B having the same tantalum material facing and mild steel substrate.

The facing layer 50 commonly will contain convolutions formed in the material to provide a thermal expansion compensated liner. These convolutions shown at 52 and 53 in FIG. 2 tend to act as bellows during service, and compensate for the differences in the coefficient of thermal expansion of the tantalum alloy material and the steel base material when the equipment is heated to and cooled from the process service temperature. If these convolutions are not contained in the facing layer, they should be formed in the material before it is assembled as in FIG. 2 since these convolutions also provide a means to prevent buckling or distortion in the fusion welds to be made in the tantalum alloy liner when the welds in the steel base material are made subsequently.

FIG. 6 illustrates the typical form contour for a convolution found effective in 0.030 inch thickness material, which is a thickness typically used in tantalum material corrosion resistant liners for chemical process applications.

The steel substrate in each member is first machined as illustrated in FIG. 2 to provide groove face 54, root face 55, and opposed grooves or channels 56 and 57 in the two members in preparation for fusion welding of the steel backing.

The specific joint geometry used for making the fusion welds in the steel backing is in accordance with "Recommended Proportions for Grooves for Arc Welding," Welding Handbook, Sixth Edition, Section One, Americal Welding Society. The welding procedure used for the steel backing is in accordance with the recomended practice given in the same reference in order to produce code quality welds.

All contaminants such as steel chips, oil and grease, or other soils must thoroughly be removed from both members by techniques such as solvent degreasing.

The lining or facing material must also be chemically cleaned before welding. The tantalum material can be chemically cleaned by pickling in an acid solution comprised of:

| | |
|---|---|
| Nitric Acid (70%) | — 3 parts by volume (60% by volume) |
| Sulphuric Acid (95%) | — 1 part by volume (20% by volume) |
| Hydrofluoric Acid (48%) | — Up to 1 part by volume (up to 20% by volume) |

Following the acid immersion, the tantalum material should be removed from the acid solution and immediately immersed in clean water. The final water rinse should be done with the water temperature above 50° C. (125° F.). Following the water rinsing, the material should be rinsed in alcohol followed by drip drying and wiping of the excess alcohol from the surface using lint-free, clean white cloth.

In welding tantalum materials, adequate cleaning of the material and shielding of the weld area with inert gas is mandatory. Such refractory metal materials can be successfully fusion welded using techniques such as inert gas shielded tungsten arc welding, or electron beam welding. The inert gas shielded tungsten arc welding (often called TIG or GTA welding) is the most commonly used procedure, and is used in the embodiment described. Thre region of the tantalum alloy material to be welded is evacuated and purged with an inert gas, generally argon, but the inert gas can be any one or a mixture of inert monatomic gases, such as argon, helium, neon, krypton or xenon.

If feasible, the entire assembly to be welded can be placed in a chamber which is evacuated and back filled with the inert gas. Alternately, a plastic bag or sheet can be taped to the liner or facing or both members A and B. A hose is fitted into the bag to inflate and purge the bag and the areas to be welded. An additional hole in the bag permits any residual air to exit, and the flow or argon is continuous so as to purge out any residual contaminants.

The inert gas should be used to purge the root side of the weld in the tantalum layers. The welding torch is inserted into an additional hole in the bag to make the weld in the tantalum material. This procedure can be used to generate a good quality, complete penetration butt weld in the tantalum meterial facing layer. It is especially important in making the weld in the tantalum material to be sure there is no contamination on the tantalum material anywhere in the vicinity of the area heated by the welding torch. The technique described can be applied to wall assemblies where the layer is metallurgically bonded to the steel base metal by techniques such as explosive cladding or roll bonding. In these cases, it is especially important that the faces 58 and 59 illustrated in FIG. 3 on the tantalum alloy material that had been previously bonded to the steel substrate be machined or appropriately conditioned so that there is no stell contamination along these surfaces before making the fusion butt weld 60 in the tantalum alloy material. If necessary, to generate a good quality butt weld, additional filler metal of the same composition as the facing layer may be added while making weld 60.

Next, the tantalum alloy weld is inspected by penetrant dye inspection and X-ray radiographs for the presence of any defects in the weld. Such inspections should show a sound and defect-free weld. Any defective areas, if found, should be repaired and inspected before proceeding further in the wall assembly.

The next step in the sequence is to add a flat insert 61 of steel base metal as illustrated in FIG. 4 before bringing together the grooves 56 and 57 of members A and B respectively into abutting coincidence with the insert 61. The insert 61 is typically about one-eighth inch thickness when the base metal thickness of members A and B is in the range of about ½ to 1 inch total thickness. The insert 61 may be a single piece, or it may be formed of two members such as illustrated as 61 and 62 in FIG. 4, which may simply be in abutting contact 63, or they may be tack welded or brazed with a silver brazing alloy, if desired, to secure them in position. The single piece or assembled insert 61 is subsequently designated as member C.

Next, a machined insert 64, also designated as member D in FIG. 4, is placed in position in the wall assembly. The member D has machined groove faces 65 and 66 and root faces 67 and 68 corresponding in joint geometry and proportions to weld faces 54 and root faces 55 in members A and B as illustrated in FIG. 2.

Next, as illustrated in FIG. 5, fusion butt welds 69 and 70 are made to join the steel base metal of members A and B to the insert member D. The roots 71 and 72 penetrates into and bond to member C in order to insure good union and sound welds. The roots of these welds should be a distance of at least one-eighth and preferably about one-fourth inch or more from the edges 76 and 77 of grooves 56 and 57 in members A and B as illustrated in FIG. 5 to avoid having a notch or stress concentration at the weld roots.

It is frequently also desirable that purging holes 73 be provided in the wall assembly for purpose of leak detection of the tantalum alloy liner during subsequent service. These purging holes can be machined after making the steel fusion welds provided considerable care is exercise so as not to machine into the tantalum alloy layer, but is it a safer and preferable practice to machine the purging holes 73 by machining purging holes 74 in member D and 75 in member C in advance before members C and D are assembled into the wall construction.

The steel welds generally are tested by penetrant dye inspection and X-ray radiographs for presence of any defects. Such inspections should show a sound and defect-free wall assembly. If defects are found, they are repaired and inspected again by the same methods.

The fabrication process of this invention can be used to assemble a wall where the tantalum alloy material is bonded to the steel substrate on one or both of the members to be joined. The principal additional precaution that must be observed in this case is that sufficient tantalum must be removed from the underside of the tantalum material layers as shown as 58 and 59 in FIG. 4 to remove any areas of iron or other foreign metallics before the tantalum material is welded as described above.

The methods for bonding the liner to the backing include the explosive cladding process (such as Detaclad process, trademark of E. I. duPont de Nemours, and Company), roll bonding the liner to the backing, and brazing the liner to the backing, such as with silver alloys. At the bond interface of explosively clad tantalum to mild steel, the bonded interface between these two materials frequently shows a wave-like appearance in the microstructure, sometimes with particles of steel encapsulated in the tantalum at the interface. It is necessary that these areas of steel be removed from the tantalum layer before making the weld in the tantalum layer in order to obtain sound, high-quality, corrosion-resistant welds.

The wall construction and method for fabrication of this invention can be applied to a wall assembly having more than two materials in the layers. It can, as an additional embodiment, be applied to a triclad wall construction comprised of a layer of tantalum explosively bonded to a layer of copper explosively bonded to steel. In this case, the layer of tantalum is regarded as the second layer and the layers of copper and iron are considered the first layer. In making the fusion welds as described in the wall assembly, copper is removed from areas where the steel welds or tantalum welds are made.

Comparison to State-of-the-Art

FIGS. 7 and 8 illustrate a wall construction and method used for several years to bond members having thermal expansion compensated liners of tantalum or Fansteel 63 Metal on the interior and steel on the exterior of chemical process equipment such as vessels, towers and piping. The two members to be joined, E and F, each have a thermal expansion compensated liner 78 and 79, respectively, and a steel shell 80 and 81, respectively, in the two member. Member G having an explosively bonded liner 82 of tantalum of Fansteel 63 Metal on a steel substrate 83 is used as a filler piece in the wall assembly. The steel is prepared for welding by machining a root face 84 and groove face 85 in member E, and root face 86 and groove face 87 in member F in accordance with the American Welding Society recommendations for groove proportions. Corresponding root faces 88 and 89 and groove faces 90 and 91 are prepared on member G. Grooves 92 and 93 are machined along the interface of liner 82 on member G as further illustrated in FIG. 9. The edge 94 of liner 78 of member E and edge 95 of the liner 79 of member F, and edges 96 and 97 of member G are next prepared so that edges 94 and 96 will be flush when bent in contact, and also edges 97 and 95, when they are bent in contact. Any iron contamination is removed from surfaces 98 and 99 of facings 78 and 79, respectively, and from corresponding surfaces of the liner strip 82.

Next, as illustrated in FIG. 8, fusion butt welds 100 and 101 are made to join the steel base material of member E to member G, and member G to member F, respectively. Then, any excess weld metal at the root of welds 100 and 101 is ground flush, and any steel chips or other soils are removed by solvent cleaning. Next, inserts 102 and 103 of the same tantalum material as the facing are placed in the positions as illustrated in FIG. 8, and are centered respectively under edges 94 and 96 which are bent into flush contact with insert 102; and insert 103 is centered under bent down edges 97 and 95. However, before these edges are bent down, purge holes 104 are drilled through steel weld 100 and tantalum material insert 102, and purging holes 105 are drilled through steel weld 101 and tantalum material insert 103. Then, after thoroughly cleaning, the tantalum welds 106 and 107 are made by TIG welding under inert conditions similar to the procedure described in the embodiment of this invention.

Comparing the improved wall construction of this invention as illustrated in FIG. 5 with the state-of-the-art construction shown in FIG. 8, the distinctions between the two methods and the improved wall assembly of this invention are apparent. The method of this invention provides a much more simple fabrication method and much improved fitup, as well as a stronger assembly.

FIGS. 9 and 10 show a method of wall assembly used for several years in joining members that have bonded tantalum material liners. This method is illustrated in FIG. 9 in which member H has an explosively clad tantalum alloy layer 108 and member I has a bonded layer 109 on steel substrates 110 and 111, respectively. A relatively complex machined configuration is required in preparing the steel members for fusion welding as also illustrated in FIG. 9. This is shown as surfaces 112, 113 and 114 on member H, and surfaces 115, 116 and 117 on member I. An insert member J, shown as 118, has a machined configuration shown as 119 and 120 to provide grooves for joining members H to J, and J to I, respectively. The facing 108 on member H and the facing 109 of member I are bent upward, and the edges 121 and 122, respectively, on the two members are prepared so that they will be essentially flush contact when they are bent downward again. Any areas of contaminations by oils, steel or other foreign materials that may exist along the formerly bonded interfaces 123 and 124 must be removed before welding on the tantalum alloy side.

The finished wall assembly is shown in FIG. 10. Fusion butt welds 125 and 126 join steel members H to J, and J to I, respectively. Then, a tantalum material insert 127 is placed on top of member J, purge holes 128 are drilled through member J and tantalum alloy insert 127. After removing any steel chips or other soils, the tantalum materials weld 129 is made under inert conditions to complete the welded wall assembly.

In comparing this method of state-of-the-art wall assembly in FIG. 10 to the wall assembly of this invention in FIG. 5, the improvements can be noted. The steel welds in FIG. 10 each have a notch which creates a defect similar to a crack near the root of each weld. By contrast, in the improved method the steel welds have complete penetration against the steel insert 61 (member C). The improved method provides such simpler machining and much greater ease of fitup, providing a much sounder, higher quanlity, final wall assembly.

Fabricating a wall of this invention has been illustrated by using specific types of materials by way of example, but the wall construction is not limiting since the method and the wall construction described can be applied to a broad spectrum of materials as covered by the claims.

We claim:
1. A wall assembly joint formed between abutting ends of layered elements each comprising a layer of first metallic material and a layer of second metallic material in face-to-face relation,
  a. an intermediate filler base member interposed between the ends of said layer of first metallic material and fusion welded to each of said ends,
  b. an inlaid insert of said first metallic material underlying the abutting ends of the other of said layered elements and bridging said fusion welds between the filler base member and the ends of said layer of first metallic material, said inlaid insert being welded to said ends by said fusion welds, and
  c. a fusion weld joining the abutting ends of said second metallic material.

2. A wall assembly according to claim 1 in which an expansion convolution is provided in each member of the second layer before the fusion weld is made joining the layer of second material of the members to each other.

3. A wall assembly according to claim 1 in which the first metallic material is selected from metals and alloys comprising titanium, zirconium, hafnium, tantalum, columbium, vanadium, iron-base, nickel-base, cobalt-base and copper-base materials, and the second metallic material is selected from metals and alloys comprising titanium, zirconium, hafnium, tantalum, columbium and vanadium.

4. A wall assembly according to claim 1 in which the layer of first material meterial is an iron-base alloy and the layer of second material is a tantalum-base material.

5. A wall assembly according to claim 1 in which the layer of first material is comprised of a layer of copper bonded to mild steel and the layer of second material is a tantalum-base material.

6. A method of fabricating a wall which includes a layer of first metallic material and a layer of second metallic material, each layer having one face in a face-to-face relation with a face of the other layer, comprising the steps of:
  a. fusion welding, under inert conditions, the layer of second material of the two members to each other,
  b. machining the first layer in each member in preparation for welding of the members to an inlaid insert of first material and to an insert of first material placed between the members of the first layer,
  c. inlaying an insert of first material in channels in the members of the first material,
  d. placing an insert of first material between the members of the first material, and
  e. fusion welding the members of the first layer to the insert of first material, the roots of said welds bonded to the inlaid insert of first material.

7. A method of fabricating a wall according to claim 6 in which an expansion convolution is formed in the second layer of each member.

8. A method of fabricating a wall according to claim 6 in which the first metallic material is selected from metals and alloys comprising titanium, zirconium, hafnium, tantalum, columbium, vanadium, iron-base, nickel-base, cobalt-base and copper-base materials, and the second metallic material is selected from metals and alloys comprising titanium, zirconium, hafnium, tantalum, columbium and vanadium.

9. A method of fabricating a wall according to claim 6 in which the layer of first material is an iron-base alloy and the layer of second material is a tantalum-base material.

10. A method of fabricating a wall according to claim 6 in which the layer of first material is comprised of a layer of copper bonded to mild steel and the layer of second material is a tantalum-base material.

* * * * *